(12) United States Patent
Myouga

(10) Patent No.: US 8,111,794 B2
(45) Date of Patent: Feb. 7, 2012

(54) DATA SYNCHRONIZER FOR SYNCHRONIZING DATA AND COMMUNICATION INTERFACE INCLUDING THE SAME

(75) Inventor: Nobuyuki Myouga, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/009,671

(22) Filed: Jan. 19, 2011

(65) Prior Publication Data

US 2011/0260759 A1   Oct. 27, 2011

(30) Foreign Application Priority Data

Apr. 27, 2010 (JP) ................................. 2010-102571

(51) Int. Cl.
*H04L 7/00* (2006.01)
(52) U.S. Cl. ..................... 375/354; 327/141; 709/248
(58) Field of Classification Search .................. 375/354; 327/141; 709/248
See application file for complete search history.

(56) References Cited

U.S. PATENT DOCUMENTS

| | | | | |
|---|---|---|---|---|
| 5,256,912 | A * | 10/1993 | Rios ............................... | 327/144 |
| 6,055,285 | A * | 4/2000 | Alston .......................... | 375/372 |
| 6,359,479 | B1 * | 3/2002 | Oprescu ....................... | 327/141 |
| 6,744,285 | B2 * | 6/2004 | Mangum et al. ................ | 326/96 |
| 6,982,575 | B2 * | 1/2006 | Stong ............................. | 327/141 |
| 6,987,404 | B2 * | 1/2006 | Duncan ......................... | 327/141 |
| 7,555,048 | B1 * | 6/2009 | Massoumi et al. ............. | 375/260 |
| 7,590,196 | B2 * | 9/2009 | Gibbs ............................ | 375/340 |
| 2003/0081707 | A1 * | 5/2003 | Takeuchi et al. .............. | 375/354 |
| 2011/0204932 | A1 * | 8/2011 | Cortadella et al. ............ | 327/145 |

FOREIGN PATENT DOCUMENTS

| | | |
|---|---|---|
| JP | 59-3544 | 1/1984 |
| JP | 02-076332 | 3/1990 |
| JP | 05-227137 | 9/1993 |
| JP | 08-237232 | 9/1996 |
| JP | 2003-143117 | 5/2003 |
| JP | 3798292 | 4/2006 |

* cited by examiner

*Primary Examiner* — Juan A Torres
(74) *Attorney, Agent, or Firm* — Patterson & Sheridan, LLP

(57) ABSTRACT

According to one embodiment, a data hold module is configured to receive first data synchronized with a first clock signal on the basis of a second timing signal and output second data obtained by synchronizing the received first data with a second clock signal differing from the first clock signal in frequency. A reception timing generator is configured to generate a timing signal synchronized with the second clock signal as the second timing signal on the basis of a first timing signal corresponding to the first data and synchronized with the first clock signal. The reception timing generator comprises flip-flops connected in cascade. An update timing adjusting module is configured to limit the timing to update the flip-flops in value on the basis of an update enable signal synchronized with the second clock signal.

9 Claims, 6 Drawing Sheets

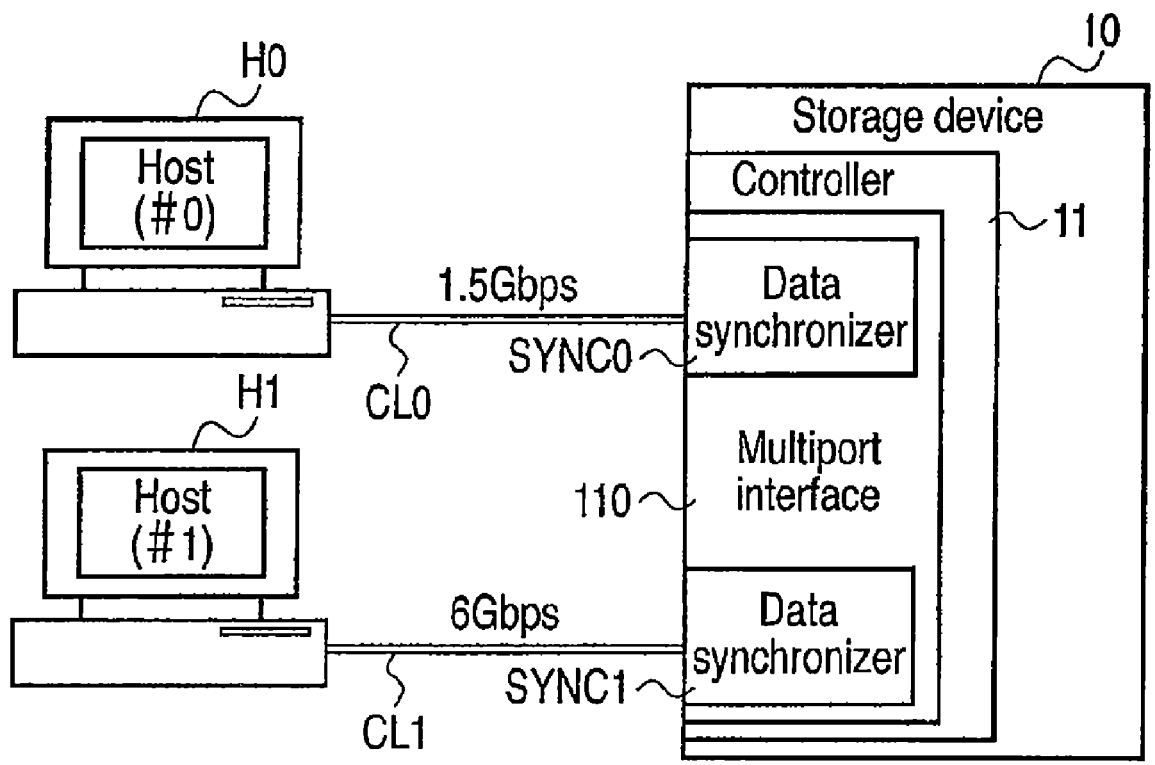
F I G. 1

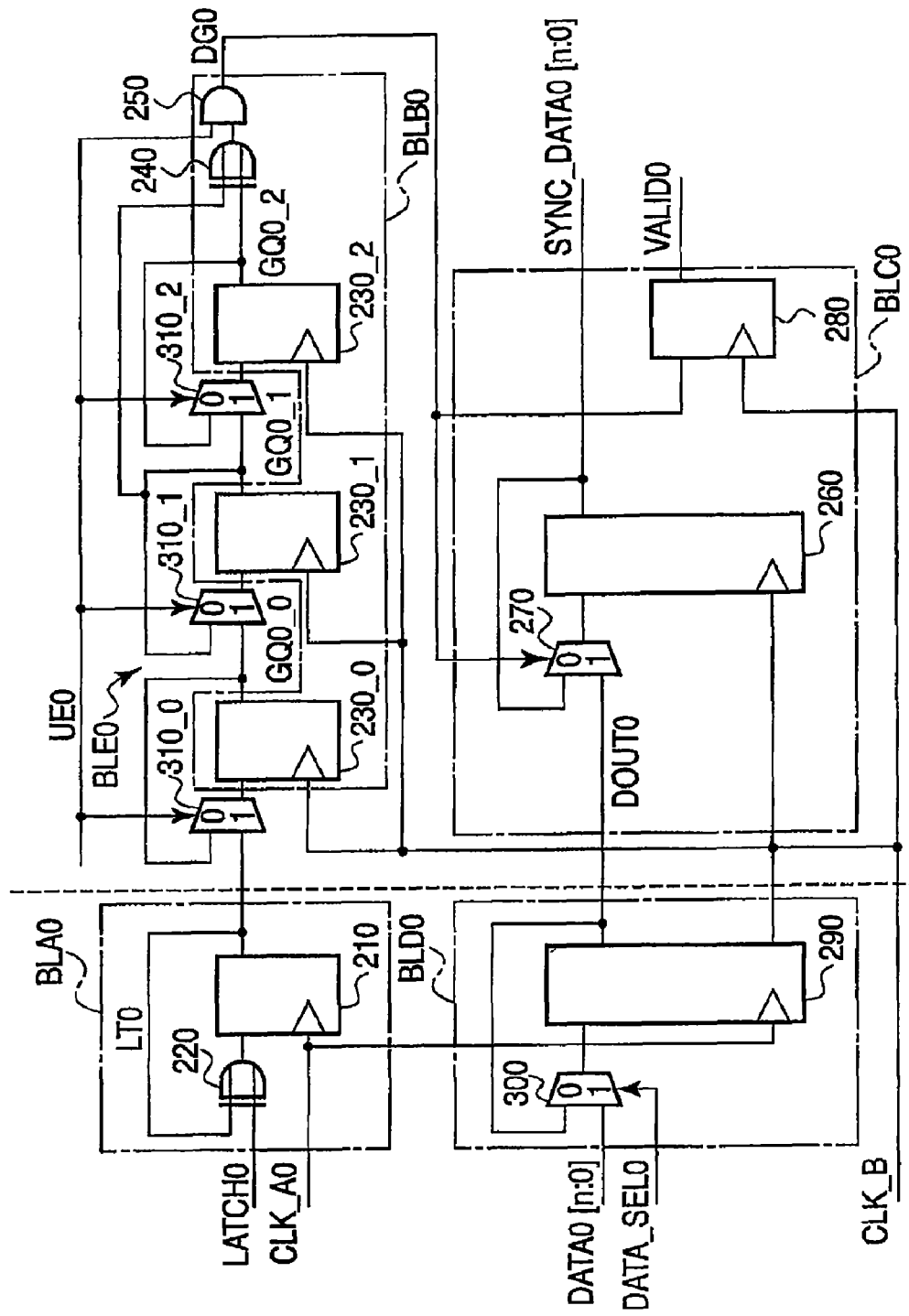
F I G. 2

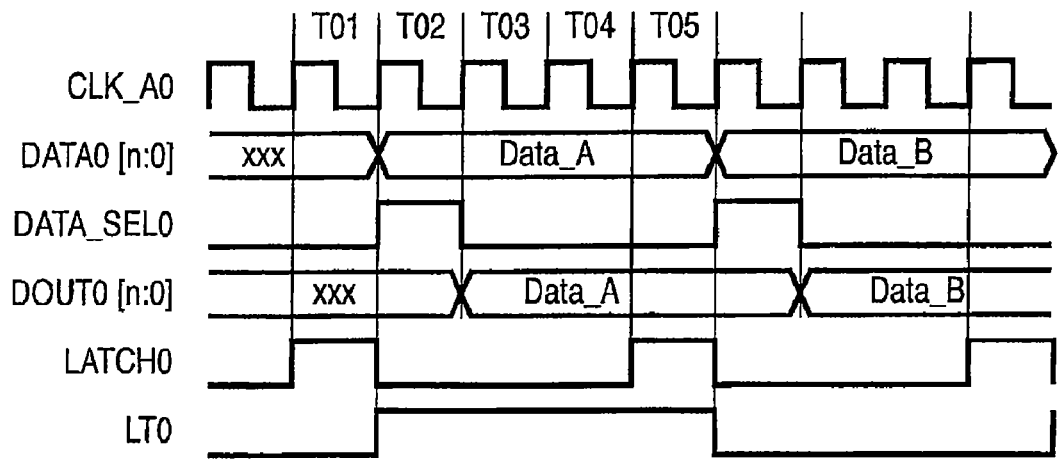
F I G. 3A
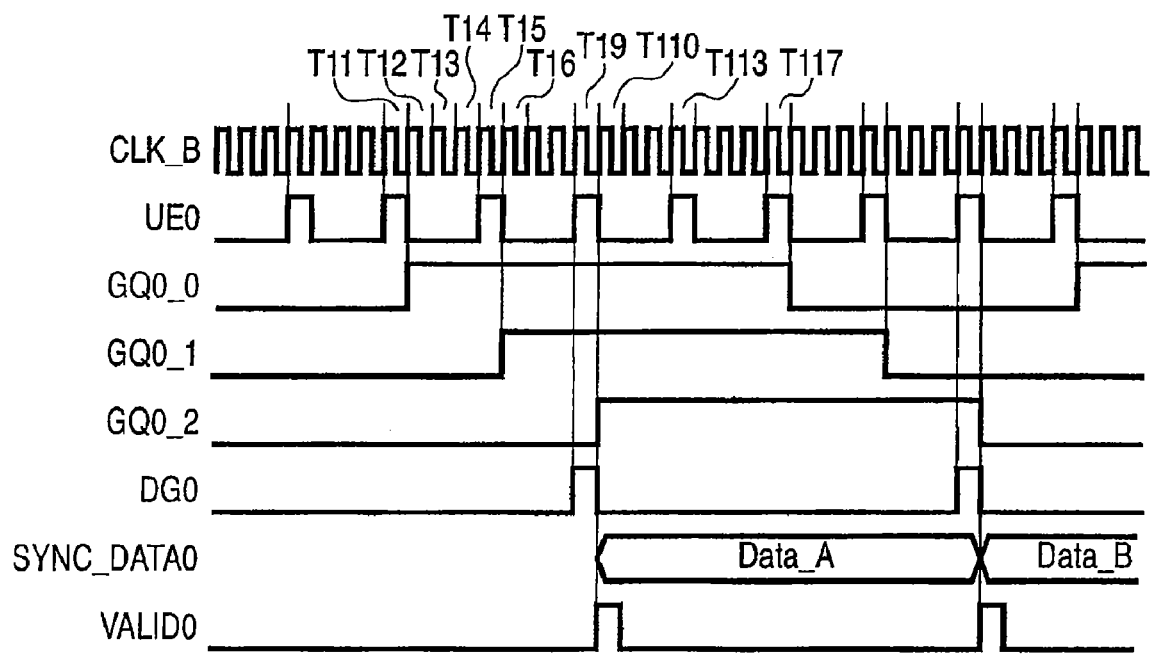
F I G. 3B

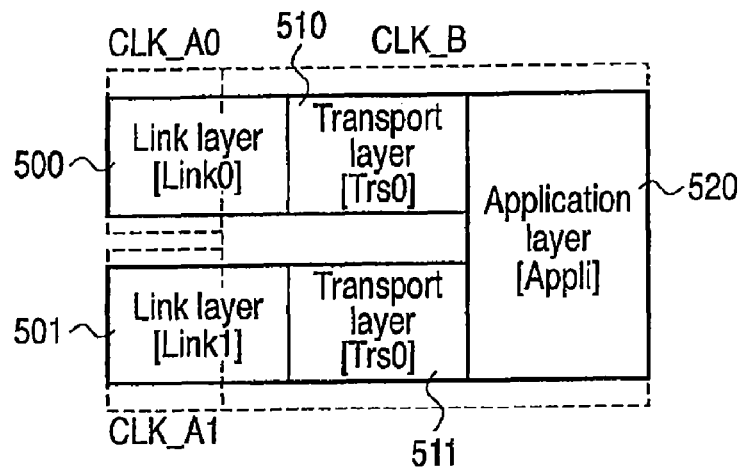
F I G. 5
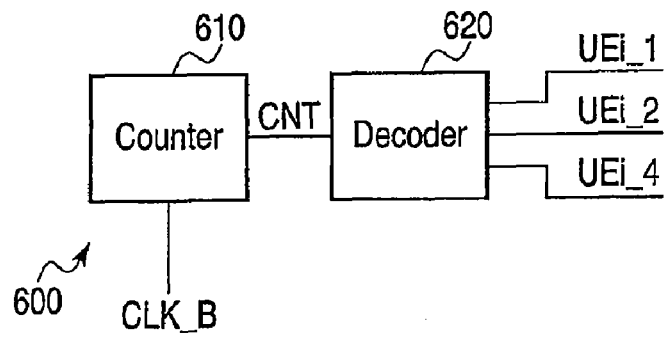
F I G. 6
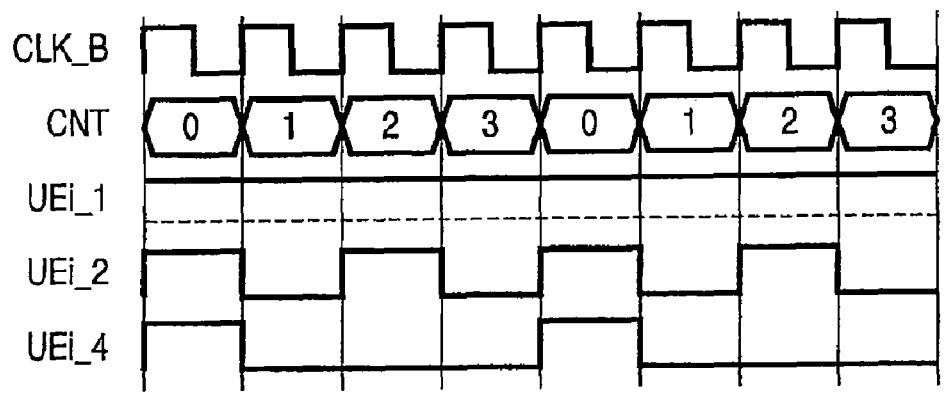
F I G. 7

DATA SYNCHRONIZER FOR SYNCHRONIZING DATA AND COMMUNICATION INTERFACE INCLUDING THE SAME

CROSS-REFERENCE TO RELATED APPLICATIONS

This application is based upon and claims the benefit of priority from Japanese Patent Application No. 2010-102571, filed Apr. 27, 2010; the entire contents of which are incorporated herein by reference.

FIELD

Embodiments described herein relate generally to a data synchronizer which synchronizes data synchronized with a first clock signal with a second clock signal and a communication interface including the data synchronizer.

BACKGROUND

Peripheral devices of a host are generally used by connecting with the host. Each of the peripheral devices includes a communication interface which transmits and receives data to and from the host. The communication interface includes a data synchronizer which synchronizes data synchronized with a first clock signal with a second clock differing from the first clock.

If peripheral devices are used by connecting with a plurality of hosts, a multiport interface must be used as a communication interface for the peripheral devices. Suppose the multiport interface includes a first port and a second port and is connected to a first host and a second host via the first port and second port, respectively. Such a multiport interface includes a first data synchronizer applied to a first link layer (described later) of the first port and a second data synchronizer applied to a second link layer (described later) of the second port.

The first port is composed of a first link layer and a first transport layer. The second port is composed of a second link layer and a second transport layer. The multiport interface has only one application layer. The reason is that one application layer is caused to collectively manage commands received by the individual ports (first and second ports). Therefore, a clock signal input to the application layer is preferably for one route; otherwise a synchronizer corresponding to each of the first and second synchronizers is needed in the application layer.

Suppose a first clock signal CLK_A0 and a second clock signal CLK_B0 are input to the first link layer and a first clock signal CLK_A1 and a second clock signal CLK_B1 are input to the second link layer. Here, the frequency of the first clock signal CLK_A0 is not necessarily the same as that of the first clock signal CLK_A1. Similarly, the frequency of the second clock signal CLK_B0 is not necessarily the same as that of the second clock signal CLK_B1.

Therefore, a third clock signal CLK_C differing in frequency from both of the second clock signals CLK_B0 and CLK_B1 is input to an application layer common to the first and second ports. In this case, the application layer requires a synchronizer for synchronizing second clock signal CLK_B0 and third clock signal CLK_C and a synchronizer for synchronizing second clock signal CLK_B1 and third clock signal CLK_C.

If the allowable frequency range of the second clock signals CLK_B0 and CLK_B1 can be extended, a second clock signal CLK_B can be used in both the first and second link layers (first and second data synchronizers) in place of the second clock signals CLK_B0 and CLK_B1. In this case, the second clock signal CLK_B can be used in an application layer common to the first and second ports and a third clock signal CLK_C requiring an additional synchronizer need not be used. Accordingly, it is hoped that the allowable frequency range of the second clock signal will be extended in the data synchronizer.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

FIG. 1 is an exemplary configuration of a system which includes a multiport interface according to an embodiment;

FIG. 2 is a block diagram showing an exemplary configuration of a data synchronizer applied to the embodiment;

FIGS. 3A and 3B are timing charts to explain an exemplary operation of the data synchronizer in the embodiment;

FIG. 5 shows, in association with clock signals used in individual hierarchical levels, an example of the relationship between a communication protocol hierarchical structure of two communication ports included in the multiport interface applied to the embodiment and an application layer;

FIG. 6 is a block diagram showing an exemplary configuration of an update enable signal generator applied to the embodiment;

FIG. 7 is a timing chart to explain an exemplary operation of the update enable signal generator in the embodiment;

DETAILED DESCRIPTION

Figure 4:
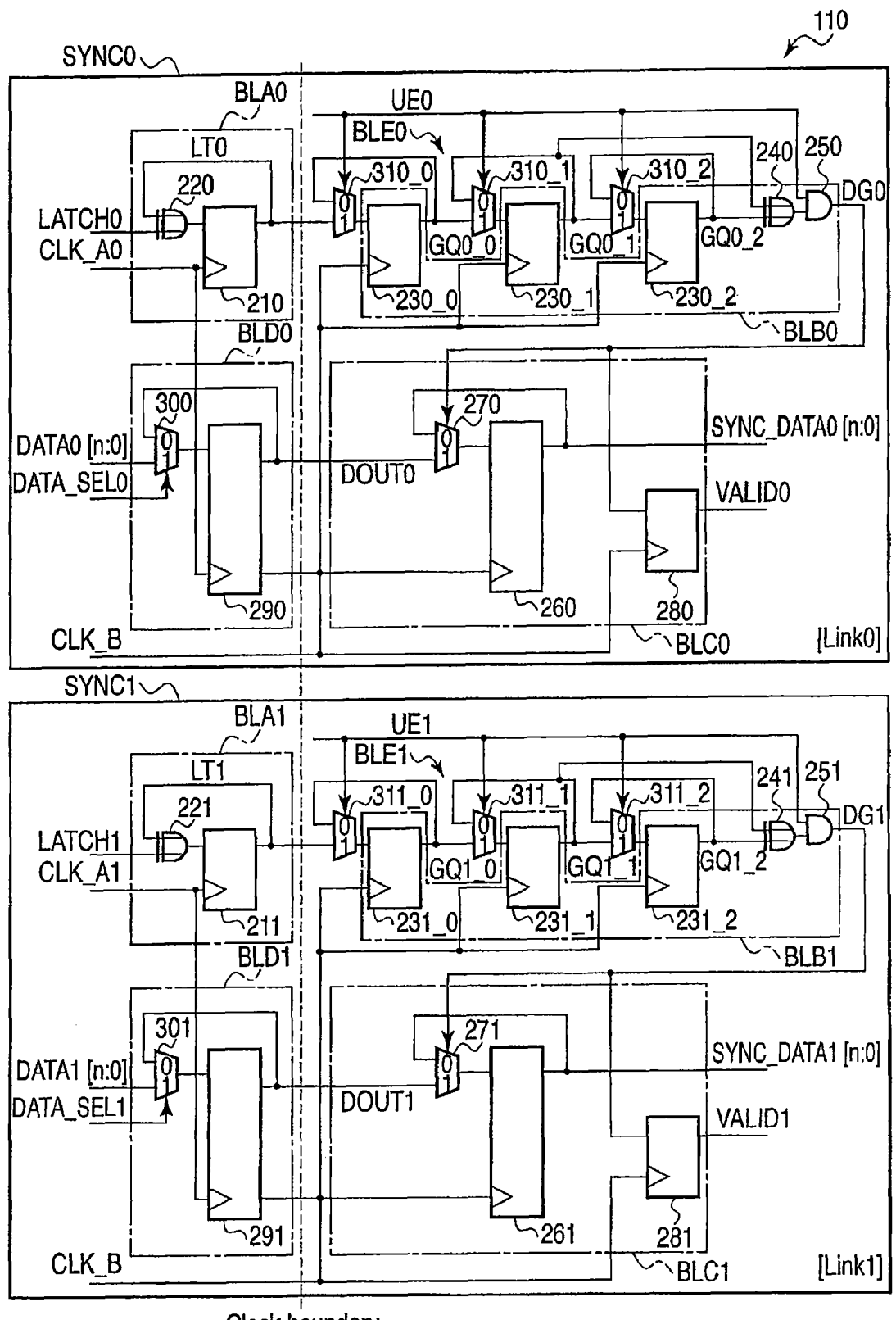
FIG. 4 is a block diagram showing an exemplary configuration of the multiport interface in the embodiment.

Various embodiments will be described hereinafter with reference to the accompanying drawings. In general, according to one embodiment, a data synchronizer comprises a data hold module, a reception timing generator, and an update timing adjusting module. The data hold module is configured to receive first data synchronized with a first clock signal on the basis of a second timing signal and output second data obtained by synchronizing the received first data with a second clock signal differing from the first clock signal in frequency. The reception timing generator is configured to generate a timing signal synchronized with the second clock signal as the second timing signal on the basis of a first timing signal corresponding to the first data and synchronized with the first clock signal. The reception timing generator comprises flip-flops connected in cascade. The update timing adjusting module is configured to limit the timing to update the flip-flops in value on the basis of an update enable signal synchronized with the second clock signal.

FIG. 1 shows the configuration of a system including a multiport interface according to an embodiment. In FIG. 1, hosts H0 and H1 are connected to, for example, a storage device 10 via communication lines CL0 and CL1, respectively. The storage device 10 is a peripheral device of hosts H0 and H1, such as a magnetic disk drive (HDD) or a solid-state drive (SSD).

In the embodiment, suppose host H0 supports an interface speed of 1.5 Gbps and host H1 supports an interface speed of 6 Gbps. Each of hosts H0 and H1 issues a command to the storage device 10 and transmits and receives data specified by the command to and from the storage device 10.

The storage device 10 includes a controller 11 which controls various parts of the storage device 10. The controller 11 includes a communication interface with a plurality of communication ports (hereinafter, referred to as a multiport interface) 110. In the embodiment, the multiport interface (multiport interface module) 110 supports a serial attached SCSI (SAS) interface. Suppose serial data is transferred between hosts H0 and H1 and the multiport interface 110. The multiport interface 110 includes serial-to-parallel converters (not shown) which convert serial data transferred from hosts H0 and H1 into (n+1)-bit bus data (n being a natural number) [n:0] in synchronized with clock signals CLK_A0 and CLK_A1, respectively. For example, (p+1)-bit parallel data (p being a natural number) [p:0] may be transferred between hosts H0 and H1 and the multiport interface 110. If p+1 is not equal to n+1, the multiport interface 110 has only to be provided with a data width converter which converts (p+1)-bit parallel data [p:0] into (n+1)-bit bus data [n:0]. In the explanation below, bus data may be simply referred to as data.

The multiport interface 110 includes a first communication port and a second communication port. As described layer with reference to FIG. 5, the first communication port is composed of a link layer 500 (Link0) and a transport layer 510 (Trs0). The second communication port is composed of a link layer 501 (Link1) and a transport layer 511 (Trs1).

The multiport interface 110 includes a data synchronizer SYNC0 constituting a part of the first communication port and a data synchronizer SYNC1 constituting a part of the second communication port. The data synchronizers SYNC0 and SYNC1 exist in the link layers Link0 and Link1, respectively. The multiport interface 110 may include more than two ports. That is, the multiport interface 110 may be configured to be capable of being connected to more than two hosts.

The data synchronizer (first data synchronizer) SYNC0 is configured to synchronize (n+1)-bit data (first data) DATA° [n:0] synchronized with clock signal (first clock signal) CLK_A0 with clock signal (second clock signal) CLK_B. The data synchronizer (second data synchronizer) SYNC1 is configured to synchronize (n+1)-bit data (third data) DATA1 [n:0] synchronized with clock signal (third clock signal) CLK_A1 with clock signal (fourth clock signal=a second clock signal) CLK_B.

FIG. 2 is a block diagram showing a configuration of data synchronizer SYNC0 shown in FIG. 1. Data synchronizer SYNC0 comprises a latch timing generator BLA0, a reception timing generator BLB0, a data hold module BLC0, a data hold module BLD0, and an update timing adjuster BLE0. Latch timing generator BLA0 and data hold module BLD0 constitute a transmission side in data transmission and reception in the data synchronizer SYNC0 (link layer Link0) and operate in synchronization with clock signal CLK_A0. The reception timing generator BLB0 and data hold module BLC0 constitute a reception side in data transmission and reception in the data synchronizer SYNC0 (link layer Link0) and operate in synchronization with clock signal CLK_B. It should be noted that neither the transmission side nor reception side shows the relationship in data transmission and reception between the data synchronizer SYNC0 (link layer Link0) and the outside.

The latch timing generator BLA0 generates a latch trigger signal (latch timing signal) LT0 as a first timing signal synchronized with clock signal CLK_A0 and corresponding to input timing of data DATA0 [n:0]. The latch timing generator BLA0 is composed of a D flip-flop (hereinafter, referred to as DFF) 210 and an exclusive OR gate (hereinafter, referred to as EXOR gate) 220. EXOR gate 220 exclusive ORs a latch signal LATCH0 corresponding to the input timing of data DATA0 [n:0] with the output of DFF 210. DFF 210 latches the output of EXOR gate 220 in accordance with clock signal CLK_A0. The output of DFF 210 is used as a latch trigger signal LT0.

The reception timing generator BLB0 generates a reception timing signal DG0 as a second timing signal synchronized with clock signal CLK_B on the basis of latch trigger signal LT0 output from the latch timing generator BLA0 (DFF 210). Reception timing signal DG0 is used as a timing signal for absorbing the difference in frequency (speed difference) between clock signal CLK_A0 and clock signal CLK_B and causing data hold module BLC0 to receive (take in) data DOUT0 [n:0] transmitted from data hold module BLD0.

The reception timing generator BLB0 is composed of, for example, three DFFs 230_0, 230_1, and 230_2, an EXOR gate 240, and an AND gate 250. DFFs 230_0, 230_1, and 230_2 are connected in cascade. That is, DFFs 230_0, 230_1, and 230_2 constitute a multistage DFF (here, three-stage DFF). Each of DFFs 230_0, 230_1, and 230_2 latches an input signal in accordance with clock signal CLK_B. In the embodiment, selectors 310_0, 310_1, and 310_2 (described later) are provided between the output of latch timing generator BLA0 (DFF 210) and the input of a first-stage (beginning stage) DFF 230_0, between the output of the first-stage DFF 230_0 and the input of a second DFF 230_1, and between the output of the second-stage DFF 230_1 and the input of a third-stage (end stage) DFF 230_2, respectively. That is, the outputs from the selectors 310_0, 310_1, and 310_2 are used as the inputs to DFFs 310_0, 310_1, and 310_2, respectively.

Data hold module BLC0 takes in data DOUT0 [n:0] corresponding to data DATA0 [n:0] output (transmitted) from data hold module BLD0 and holds data DOUT [n:0]. Data hold module BLC0 includes a DFF 260 and a selector 270 corresponding to each of the bits in data DATA0 [n:0]. In FIG. 2, although only a pair of DFF 260 and selector 270 is shown for the sake of simplicity, data hold module BLC0 includes as many pairs of DFF 260 and selector 270 as equals the number of bits n+1 in data DATA0 [n:0]. In the explanation below, it is assumed for descriptive purposes that DFF 260 and selector 270 correspond to data DATA0 [n:0].

Selector 270 selects either data DATA0 [n:0] input to data hold module BLD0 or the output of DFF 260 in accordance with reception timing signal DG0 output from reception timing generator BLB0. DFF 260 latches the output of selector 270 in accordance with clock signal CLK_B. That is, DFF 260 takes in (receives) data DOUT0 [n:0] output from data hold module BLD0 in accordance with reception timing signal DG0 and outputs data DOUT0 [n:0] as data SYNC_DATA0 [n:0] with the next timing (clock) in clock signal CLK_B.

Data hold module BLC0 also includes a DFF 280 which latches reception timing signal DG0 in accordance with clock signal CLK_B. The output signal of DFF 280 is used as timing signal VALID0 that indicates that data SYNC_DATA0 becomes valid.

Data hold module BLD0 takes in data DATA0 [n:0] input to the data hold module BLD0 at the moment specified by latch signal LATCH0 and holds data DATA0 [n:0]. Data hold module BLD0 includes a DFF 290 and a selector 300 corresponding to each of the bits in data DATA0 [n:0]. That is, in FIG. 2, although only a pair of DFF 290 and selector 300 is shown for the sake of simplicity, data hold module BLD0 includes as many pairs of DFF 290 and selector 300 as equals the number of bits n+1 in data DATA0 [n:0]. In the explanation below, it is assumed for descriptive purposes that DFF 290 and selector 300 correspond to data DATA0 [n:0].

Selector 300 selects either data DATA0 [n:0] input to data hold module BLD0 or the output of DFF 290 in accordance with data selection signal DATA_SEL0. In the embodiment, selector 300 selects data DATA0 [n:0] when data selection signal DATA_SEL0 is high (or at logical 1). Data selection signal DATA_SEL0 is in synchronization with clock signal CLK_A0 and indicates timing one cycle of clock signal CLK_A0 later than latch signal LATCH0. DFF 290 latches the output of selector 300 in accordance with clock signal CLK_A0. That is, DFF 290 takes in data DATA0 [n:0] in accordance with data selection signal DATA_SEL0 and outputs data DATA0 [n:0] as data DOUT with the next timing (clock) of clock signal CLK_A0.

Update timing adjuster BLE0 adjusts the timing to update the values held in DFFs 230_0, 230_1, and 230_2 of reception timing generator BLB0 once in N cycles (N being a natural number) of clock signal CLK_B in accordance with update enable signal UE0. In the embodiment, N is 4. Update timing adjuster BLE0 is composed of selectors 310_0, 310_1, and 310_2.

Selector 310_0 selects either a latch trigger signal LT0 indicating latch timing output from latch timing generator BLA0 (DFF 210) to reception timing generator BLB0 or the output GQ0_0 of DFF 230_0 in accordance with update enable signal UE0. In the embodiment, selector 310_0 selects latch trigger signal LT0 when update enable signal UE0 is high (or at logical 1). DFF 230_0 latches the output of selector 310_0 in accordance with clock signal CLK_B.

Selector 310_1 selects either the output GQ0_0 of DFF 230_0 or the output GQ0_1 of DFF 230_1 in accordance with update enable signal UE0. DFF 230_1 latches the output of selector 310_1 in accordance with clock signal CLK_B. Selector 310_2 selects either the output GQ0_1 of DFF 230_1 or the output GQ0_2 of DFF 230_2 in accordance with update enable signal UE0. DFF 230_2 latches the output of selector 310_2 in accordance with clock signal CLK_B. In the embodiment, selectors 310_1 and 310_2 select the outputs of DFFs 230_1 and 230_2, respectively, when update enable signal UE0 is high (or asserted).

As described above, the timing for the values of DFFs 230_0, 230_1, and 230_2 to be updated is limited to a period during which update enable signal UE0 is high in the timing shown by clock signal CLK_B. That is, the timing for the values of DFFs 230_0, 230_1, and 230_2 to be updated is limited (or adjusted) by update timing adjuster BLE0.

Data synchronizer SYNC1 also has the same configuration as that of data synchronizer SYNC0 shown in FIG. 2 (see FIG. 4). If necessary, read SYNC1 for SYNC0 and BLA1, BLB1, BLC1, BLD1 and BLE1 for BLA0, BLB0, BLC0, BLD0, and BLE0, respectively, in the explanation of the configuration of the data synchronizer SYNC0. Similarly, read DFFs 211, 2310, 231_1, 231_2, 261, 281, and 291 for DFFs 210, 230_0, 230_1, 230_2, 260, 280, and 290, respectively, and EXOR gates 221 and 241 for EXOR gates 220 and 240, respectively, and AND gate 251 for AND gate 250, and selectors 271, 301, 3110, 311_1, and 311_2 for selectors 270, 300, 3100, 310_1, and 310_2, respectively. Similarly, read LATCH1, CLK_A1, DATA1, DATA_SEL1, LT1, GQ1_0, GQ1_1, GQ1_2, DG1, UE1, DOUT1, SYNC_DATA1, and VALID1 for LATCH0, CLK_A0, DATA0, DATA_SEL0, LT0, GQ0_0, GQ0_1, GQ0_2, DG0, UE0, DOUT0, SYNC_DATA0, and VALID0, respectively.

Next, the operation of data synchronizer SYNC0 shown in FIG. 2 will be explained with reference to timing charts in FIGS. 3A and 3B.

First, suppose data Data_A as data DATA0 [n:0] has been input to data hold module BLD0 operating in accordance with clock signal CLK_A0 in, for example, cycle (timing) T02 of clock signal CLK_A0. Then, data Data_A is loaded into DFF 290 of data hold module BLD0 in accordance with data selection signal DATA_SEL0. Data Data_A loaded into DFF 290 is output as DOUT0 [n:0] from DFF 210 in the next cycle T03.

Latch signal LATCH0 is input to latch timing generator BLA0 operating in accordance with clock signal CLK_A0 as to data hold module BLD0. Latch signal LATCH0, which is in synchronization with clock signal CLK_A0, becomes high (valid) one cycle (period) of clock signal CLK_A0 earlier than data selection signal DATA_SEL0. Here, suppose latch signal LATCH0 has become high in cycle T01 one cycle earlier than cycle T02. That is, valid latch signal LATCH0 has been input to latch timing generator BLA0 in cycle T01.

Then, DFF 210 latches latch signal LATCH0 in accordance with clock signal CLK_A0 and outputs the latched signal as a latch trigger signal LT0 in the next cycle T02. The latch trigger signal LT0 is latched in DDF 210 in accordance with clock signal CLK_A0 until latch signal LATCH0 becomes valid. In the embodiment, data DATA0 [n:0] contains 8 bits (n=7). Four data DATA0 [n:0] are combined to produce 32-bit data. Accordingly, data DATA0 [n:0] is input to data hold module BLD0 at intervals of four cycles of clock signal CLK_A0. Latch signal LATCH0 is in synchronization with the input timing and becomes valid (or is asserted) once in four cycles of clock signal CLK_A0. In this case, the output of DFF 210, that is, latch trigger signal LT0, alternates between high and low at intervals of four cycles of clock signal CLK_A0.

On the other hand, in reception timing generator BLB0 operating in accordance with clock signal CLK_B, DFF 230_0 outputs signal GQ0_0 in cycle T12 of clock signal CLK_B arriving first since the beginning of cycle T02 in which valid latch timing signal LT0 is input to the reception timing generator BLB0. Suppose the frequency of clock signal CLK_B is in the range of 360 MHz≦CLK_B≦1200 MHz as described later.

Suppose a case where update timing adjuster BLE0 does not exist and the update timing of the values of DFFs 230_0, 230_1, and 230_2 in reception timing generator BLB0 is not adjusted (or limited). That is, suppose selectors 310_0, 310_1, and 310_2 are not provided on the input side of DFFs 230_0, 230_1, and 230_2 of reception timing generator BLB0, respectively, in the conventional art. In this case, unlike in the timing chart of FIG. 3B, DFF 230_1 outputs signal GQ0_1 in cycle T13 of clock signal CLK_B next to cycle T12. Similarly, unlike in the timing chart of FIG. 3B, DFF 230_2 outputs signal GQ0_2 in cycle T14 of clock signal CLK_B next to cycle T13. EXOR gate 240 exclusive ORs the output of DFF 230_1 with the output of DFF 230_2. If update timing adjuster BLE0 does not exist, the result of exclusive ORing performed by EXOR gate 240 is used as reception timing signal DG0 in data hold module BLC0.

(a) Next, in a state where update timing adjuster BLE0 does not exist, suppose the frequency of clock signal CLK_B is lower than that of clock signal CLK_A0. In this case, during a period (hold period H) when data hold module BLD0 holds data Data_A, Data_B, ... as data DATA0 [n:0], data must be loaded into data hold module BLC0 (or data hold module BLC0 operating in accordance with clock signal CLK_B) according to reception timing signal DG0. The hold period H is a period from when data DATA0 [n:0] is input to data hold module BLC0 until data hold module BLD0 has completed the output.

To generate reception timing signal DG0, a period of m clocks (cycles) of clock signal CLK_B is needed if the number of DFFs (or the number of stages of DFFs) in reception timing generator BLB0 is m. Therefore, the frequency of clock signal CLK_B must satisfy the following expression for the frequency of clock signal CLK_A0:

$$CLK\_B \geq CLK\_A0 \times m/H \quad (1)$$

(b) In contrast, in a state where update timing adjuster BLE0 does not exist, suppose the frequency of clock signal CLK_B is higher than that of clock signal CLK_A0. In this case, reception timing signal DG0 must be output one cycle of clock signal CLK_A0 later than the time when data is input to data hold module BLC0. Reception timing signal DG0 is output (m−1) cycles of clock signal CLK_B later than the time when an (m−1)-stage one of multiple stages (m stages) of DFFs in reception timing generator BLB0 outputs an output signal, that is, the time when data is input to data hold module BLC0. Accordingly, the frequency of clock signal CLK_B must satisfy the following expression for the frequency of clock signal CLK_A0:

$$CLK\_B \leq CLK\_A0 \times (m-1) \quad (2)$$

That is, if update timing adjuster BLE0 does not exist, the frequency of clock signal CLK_B must satisfy the following expression for the frequency of clock signal CLK_A0:

$$CLK\_A0 \times m/H \leq CLK\_B \leq CLK\_A0 \times (m-1) \quad (3)$$

The same holds true for the frequency of clock signal CLK_B and that of clock signal CLK_A1. That is, if update timing adjuster BLE1 does not exist, the frequency of clock signal CLK_B must satisfy the following expression for the frequency of clock signal CLK_A1:

$$CLK\_A1 \times m/H \leq CLK\_B \leq CLK\_A1 \times (m-1) \quad (4)$$

Here, suppose m=3, H=5, CLK_A0=150 MHz, and A1=600 MHZ.

If update timing adjuster BLE0 does not exist, the frequency condition of clock signal CLK_B necessary for data synchronizer SYNC0 is as follows:

$$90 \text{ MHz} \leq CLK\_B \leq 300 \text{ MHz}$$

$$\text{for } CLK\_A0=150 \text{ MHz} \quad (5)$$

On the other hand, if update timing adjuster BLE1 does not exist, the frequency condition of clock signal CLK_B necessary for data synchronizer SYNC1 is as follows:

$$360 \text{ MHz} \leq CLK\_B \leq 1200 \text{ MHz}$$

$$\text{for } CLK\_A0=600 \text{ MHz} \quad (6)$$

As is clear from the frequency conditions of clock signal CLK_B, if neither data synchronizer SYNC0 nor SYNC1 includes update timing adjuster BLE0 or BLE1, respectively, when m=3, H=5, CLK_A0=150 MHz, and A1=600 MHz, data synchronizer SYNC0 differs completely from data synchronizer SYNC1 in the frequency range of clock signal CLK_B. Therefore, clock signal CLK_B0 whose frequency is compatible with data synchronizer SYNC0 and clock signal CLK_B1 whose frequency is compatible with data synchronizer SYNC1 are needed. Accordingly, in an application layer common to data synchronizers SYNC0 and SYNC1, clock signal CLK_C differing in frequency from both of clock signals CLK_B0 and CLK_B1 is needed. In this case, the application layer requires a synchronizer for synchronizing clock signal CLK_B0 and clock signal CLK_C and a synchronizer for synchronizing clock signal CLK_B1 and clock signal CLK_C.

In contrast, in the embodiment where update timing adjusters BLE0 and BLE1 are included in data synchronizers SYNC0 and SYNC1, respectively, common clock signal CLK_B can be used in data synchronizers SYNC0 and SYNC1 as described in detail later.

In the embodiment, selector 310_0 of update timing adjuster BLE0 outputs latch trigger signal LT0 output from DFF 210 of latch timing generator BLA0 to the first-stage DFF 230_0 of reception timing generator BLB0 only during a period when update enable signal UE0 is asserted. Update enable signal UE0 is asserted once in four cycles of clock signal CLK_B. That is, update enable signal UE0 is asserted in, for example, cycles T11, T15, and T19 as shown in FIG. 3B.

DFF 230_0 latches latch trigger signal LT0 (more specifically, binary level of latch trigger signal T0) in accordance with clock signal CLK_B during a period when update enable signal UE0 is asserted. That is, DFF 230_0 updates its latched value to a binary level of latch trigger signal LT0 at the time in accordance with clock signal CLK_B during a period when update enable signal UE0 is asserted, such as clock signal CLK_B in cycle T11. DFF 230_0 outputs its latched value as signal GQ0_0 in cycle T12 of clock signal CLK_B next to cycle T11 as shown in FIG. 3B.

During a period when update enable signal UE0 is not asserted, that is, during a period of three of four cycles of clock signal CLK_B, such as a period of cycles T12 to T14, selector 3100 outputs signal GQ0_0 output from DFF 230_0 to DFF 230_0. DFF 230_0 latches signal GQ0_0 output by itself in accordance with clock signal CLK_B in cycles T12 to T14. Therefore, the value latched in DFF 230_0 is not updated in a period of cycles T12 to T14 following cycle T11. That is, DFF 230_0 holds the same value in four cycles T11 to T14.

On the other hand, DFF 210 of latch timing generator BLA0 transits from one state to another at intervals of four cycles of clock signal CLK_B as described above. In other words, latch trigger signal LT0, the output of DFF 210, remains in the same state during a period of four cycles of clock signal CLK_A0. Therefore, in a period of cycles T02 to T05 of clock signal CLK_A0, even if the value latched in DFF 230_0 is updated in cycles of clock signal CLK_B when update enable signal UE0 is asserted, excluding cycle T11, that is, in cycles T15, T19, and T113, the value itself remains unchanged. The state of DFF 230_0 is held during a period of 16 cycles of clock signal CLK_B.

Selector 310_1 of update timing adjuster BLE0 outputs signal GQ0_0 output from DFF 230_0 to the second-stage DFF 230_1 of reception timing adjuster BLE0 only during the period when update enable signal UE0 is asserted. DFF 230_1 latches signal GQ0_0 in accordance with clock signal CLK_B during the period when update enable signal UE0 is asserted. That is, DFF 230_1 updates its latched value to a binary level of signal GQ0_0 at the time in accordance with clock signal CLK_B during the period when update enable signal UE0 is asserted, such as clock signal CLK_B in cycle T15. DFF 230_1 outputs its latched value as signal GQ0_1 in cycle T16 of clock signal CLK_B next to cycle T15 as shown in FIG. 3B.

Selector 310_2 of update timing adjuster BLE0 outputs signal GQ0_1 output from DFF 230_1 to the third-stage DFF 230_2 of reception timing generator BLB0 only during the period when update enable signal UE0 is asserted. DFF 230_2 latches signal GQ0_1 in accordance with clock signal CLK_B during the period when update enable signal UE0 is asserted. That is, DFF 230_2 updates its latched value to a binary level of signal GQ0_1 at the time in accordance with clock signal CLK_B during the period when update enable signal UE0 is asserted, such as clock signal CLK_B in cycle T19. DFF 2302 outputs its latched value as signal GQ0_2 in cycle T110 of clock signal CLK_B next to cycle T19 as shown in FIG. 3B.

EXOR gate 240 (first logic gate) exclusive ORs signal GQ0_1 output from DFF 230_1 with signal GQ0_2 output from DFF 2302. By exclusive OR, EXOR gate 240 detects a state where signal GQ0_1 (output of DFF 230_1) differs from signal GQ0_2 (output of DFF 230_2) in value (in this case, a state where the values of the two outputs differ from each other for the first time after the timing indicated by latch timing signal LT0). A logic gate other than the EXOR gate may be used, provided that the logic gate can detect such a state.

AND gate 250 (second logic gate) outputs the output signal of EXOR gate 240 (result of exclusive OR operation) as reception timing signal DG0 only during a period when update enable signal UE0 is asserted. As a result, although update enable signal UE0 is asserted once in four cycles of clock signal CLK_B, reception timing signal DG0 can be asserted once in 16 cycles of clock signal CLK_B. Moreover, reception timing signal DG0 is asserted after latch trigger signal LT0 has been asserted and after data DOUT0 has been changed.

Here, suppose invalid data XXX is changed to first data Data_A of a series of data Data_A, Data_B, . . . as shown in FIG. 3A. In this case, reception timing signal DG0 is asserted after latch trigger signal LT0 has been asserted and after data DOUT0 has been changed from invalid data XXX to data Data_A (specifically, at the time when seven cycles of clock signal CLK_B have passed since cycle T01 of clock signal CLK_A0 in which latch trigger signal LT0 was asserted). Therefore, even if the frequency of clock signal CLK_B is higher than the frequency (CLK_A0=150 MHz) of clock signal CLK_A0 (360 MHz≦CLK_B≦1200 MHz), there is no possibility that DFF 260 will output invalid data XXX as data SYNC_DATA0 [n:0] in data hold module BLC0.

In contrast, in the conventional art, when the number of stages of DFFs in reception timing generator BLB0 is 3 (m ~3) as in the embodiment, reception timing signal DG0 is asserted after two cycles of clock signal CLK_B have passed since cycle T01 of clock signal CLK_A0 in which latch trigger signal LT0 was asserted. Therefore, if the frequency of clock signal CLK_B is higher than twice the frequency of clock signal CLK_A0 as described above, reception timing signal DG0 is asserted before data DOUT0 is changed from invalid data XXX to data Data_A. Then, data hold module BLC0 outputs invalid data XXX as data SYNC_DATA0 [n:0]. In the embodiment, even if the output of EXOR gate 240 is used as reception timing signal DG0 without using AND gate 250, the time when reception timing signal DG0 is asserted can be delayed for a period of three cycles of clock signal CLK_B as compared with in the conventional art.

DFF 280 of data hold module BLC0 latches reception timing signal DG0 in accordance with clock signal CLK_B and outputs reception timing signal DG0 as timing signal VALID0 in the next cycle of clock signal CLK_B. That is, as shown in FIG. 3B, DFF 280 asserts timing signal VALID0 in a cycle (e.g., T20) next to the cycle (e.g., T19) of clock signal CLK_B in which reception timing signal DG0 was asserted. Timing signal VALID0 is asserted in this way, making valid data SYNC_DATA0 output from data hold module BLC0 (DFF 260). Therefore, a module subsequent to data synchronizer SYNC0 (data hold module BLC0) can recognize data SYNC_DATA0 only at the time when timing signal VALID0 is asserted.

As described above, in the embodiment, update enable signal UE0 used in update timing adjuster BLE0 in data synchronizer SYNC0 is asserted once in four cycles of clock signal CLK_B. Accordingly, clock signal CLK_B' for DFFs 230_0, 230_1, and 230_2 of reception timing generator BLB0 to practically latch values (or update values) is equivalent to a quartered one of clock signal CLK_B, and not clock signal CLK_B itself.

Therefore, if the frequency condition for clock signal CLK_B used in both of data synchronizers SYNC0 and SYNC1 is 360 MHz≦CLK_B≦1200 MHz, the frequency condition for clock signal CLK_B' can be regarded as 90 MHz≦CLK_B'≦300 MHz. This means that data hold module BLC0 can synchronize data DOUT0 synchronized with clock signal CLK_A0 whose frequency is 150 MHz with clock signal CLK_B whose frequency is in the range of 360 MHz≦CLK_B≦1200 MHz in accordance with reception timing signal DG0. Data DOUT0 is transmitted from data hold module BLD0 to data hold module BLC0. Reception timing signal DG0 is output from reception timing generator BLB0.

FIG. 4 is a block diagram showing a detailed configuration of multiport interface 110 shown in FIG. 1. In FIG. 4, multiport interface 110 comprises data synchronizer SYNC0 configured as shown in FIG. 2 and data synchronizer SYNC1 having the same configuration as that of data synchronizer SYNC0.

In the embodiment, suppose the frequency of clock signal CLK_A0 used in data synchronizer SYNC0 is 150 MHz (CLK_A0=150 MHz) and the frequency of clock signal CLK_A1 used in data synchronizer SYNC1 is 600 MHz (CLK_A1=600 MHz). The frequency of clock signal CLK_B used in both data synchronizers SYNC0 and SYNC1 is assumed to be in the range of not lower than 360 MHz but not higher than 1200 MHz (360 MHZ≦CLK_B≦1200 MHz) as described above. In FIG. 4, to avoid complexity, clock signal CLK_B is written in each of data synchronizers SYNC0 and SYNC1. In the embodiment, however, one clock signal CLK_B is input to both of data synchronizers SYNC0 and SYNC1.

In the embodiment, update enable signal (first update enable signal) UE0 used in data synchronizer SYNC0 (that is, on link layer Link0 side) is asserted once in four cycles of clock signal CLK_B as described above. In contrast, update enable signal (second update enable signal) UE1 used in data synchronizer SYNC1 (that is, on link layer Link1 side) is asserted in all the cycles of clock signal CLK_B.

Therefore, data synchronizer SYNC0 can adjust (or limit) the time when to update the value held in each of DFF 230_0, 230_1, and 230_2 of reception timing generator BLB0 to once in four cycles of clock signal CLK_B as described above. In contrast, in data synchronizer SYNC1, each of DFFs 231_0, 231_1, and 231_2 of reception timing generator BLB1 updates its held value in each cycle of clock signal CLK_B. Consequently, although the frequency of clock signal CLK_A0 being 150 MHz differs from that of clock signal CLK_A1 being 600 MHz, data synchronizers SYNC0 and SYNC1 can synchronize data DOUT0 and data DOUT1 with clock signal CLK_B whose frequency is in the range of 360 MHZ≦CLK_B≦1200 MHz.

FIG. 5 shows, in association with clock signals used in individual hierarchical levels, the relationship between a communication protocol hierarchical structure of a first and a second communication port included in the multiport interface 110 of FIG. 1 and an application layer. The first communication port is composed of a link layer 500 (Link0) and a transport layer 510 (Trs0). The second communication port is composed of a link layer 501 (Link1) and a transport layer 511 (Trs1). Data synchronizers SYNC0 and SYNC1 exist in link layers Link0 and Link1, respectively.

The transmission side of link layers Link0 and Link1, that is, the part that transmits data DOUT0 and data DOUT1 shown in FIG. 3A (data hold modules BLD0 and BLD1), uses clock signals CLK_A0 and CLK_A1 differing in frequency. Here, the frequencies of clock signals CLK_A0 and CLK_A1 are 150 MHz (CLK_A0=150 MHz) and 600 MHZ (CLK_A1=600 MHz). In contrast, the reception side of link layers Link0 and Link1, that is, the part that receives data DOUT0 and DOUT1 synchronized with clock signals CLK_A0 and CLK_A1 respectively (data hold modules BLC0 and BLC1), shares clock signal CLK_B. The frequency of clock signal CLK_B is in the range of 360 MHZ≦CLK_B≦1200 MHz. Moreover, in transport layers Trs0 and Trs1 and application layer Appli, too, clock signal CLK_B is shared.

As is clear from the operation of the data synchronizer SYNC0 descried with reference to FIGS. 3A and 3B, data DOUT0 (first data) and data DOUT1 (third data) synchronized with clock signals CLK_A0 and CLK_A1 received on the reception side of link layers Link0 and Link1 are synchronized with clock signal CLK_B on the reception side. Data DOUT0 and data DOUT1 synchronized with clock signal CLK_B are output as data SYNC_DATA0 (second data) and data SYNC_DATA1 (fourth data), respectively.

Data SYNC_DATA0 and data SYNC_DATA1 synchronized with clock signal CLK_B are gathered into application layer Appli operating in accordance with clock signal CLK_B via transport layers Trs0 and Trs1 operating in accordance with clock signal CLK_B, respectively. As a result, data SYNC_DATA0 and data SYNC_DATA1 are processed in application layer Appli.

In the embodiment, data DOUT0 and data DOUT1 synchronized with clock signal CLK_A0 and clock signal CLK_A1 (CLK_A0=150 MHz, CLK_A1=600 MHz) sent from the transmission side of link layers Link0 and Link1 can be synchronized with clock signal CLK_B in the range of 360 MHZ≦CLK_B≦1200 MHz on the reception side of link layers Link0 and Link1. That is, it is possible to synchronize data with clock signal CLK_B in place of clock signal CLK_A0 and further with clock signal CLK_B in place of clock signal CLK_A1.

Accordingly, in transport layers Trs0 and Trs1 and further application layer Appli common to the individual ports, clock signal CLK_B can be shared. Therefore, unlike the conventional art, there is no need to prepare a synchronizer corresponding to each of data synchronizers SYNC0 and SYNC1.

FIG. 6 is a block diagram showing the configuration of an update enable signal generator applied to the embodiment. As shown in FIG. 6, update enable signal generator 600 is composed of a counter 610 and a decoder 620. Counter 610, which is, for example, a 2-bit counter, counts the number of clocks of clock signal CLK_B. Decoder 620 decodes the count CNT of counter 610. On the basis of decoding the count CNT, decoder 620 asserts update enable signal UEi_1, UEi_2, or UEi_4.

Next, the operation of update enable signal generator 600 shown in FIG. 6 will be explained with reference to a timing chart in FIG. 7. Counter 610 does a count in synchronization with clock signal CLK_B. In the embodiment where counter 610 is a 2-bit counter, the count CNT of counter 610 repeats 0, 1, 2, and 3 in that order in synchronization with clock signal CLK_B.

Decoder 620 outputs valid update enable signal UEi_4 during a period (cycle) when the count CNT of counter 610 is 0. That is, update enable signal UEi_4 output from decoder 620 (update enable signal generator 600) is asserted once in four cycles of clock signal CLK_B. Accordingly, update enable signal UEi_4 has only to be used as update enable signal UE0 in data synchronizer SYNC0 (link layer Link0 side).

Decoder 620 always outputs update enable signal UEi_1, regardless of the count CNT of counter 610. That is, update enable signal UEi_1 output from decoder 620 is asserted over all the cycles of clock signal CLK_B. Therefore, update enable signal UEi_1 is used as update enable signal UE1 in data synchronizer SYNC1 (link layer Link1 side).

Decoder 620 outputs valid update enable signal UEi_2 during a period when the count CNT of counter 610 is 0 or 2, that is, during a period when the least significant bit in the count CNT is 0. That is, update enable signal UEi_2 output from decoder 620 is asserted once in two cycles of clock signal CLK_B. If update enable signal UEi_2 is used in data synchronizer SYNC0 in place of update enable signal UE0, the value held in each of DFFs 230_0, 230_1, and 230_2 is updated once in two cycles of clock signal CLK_B. Accordingly, assuming the frequency of clock signal CLK_A0 is 300 MHz differently from the embodiment, to synchronize data synchronized with clock signal CLK_A0 whose frequency is 300 MHz with clock signal CLK_B in the range of 360 MHZ≦CLK_B≦1200 MHz, update enable signal UEi_2 may be used in place of update enable signal UE0.

Furthermore, update enable generator 600 may be provided so as to be shared by data synchronizers SYNC0 and SYNC1 or to be provided for each of data synchronizers SYNC0 and SYNC1. In the latter case, update enable signal generator 600 may be configured to be capable of generating only an update enable signal used in the corresponding data synchronizer.

[Modification]

Next, a modification of the embodiment will be explained with reference to the drawings.

Figure 8:
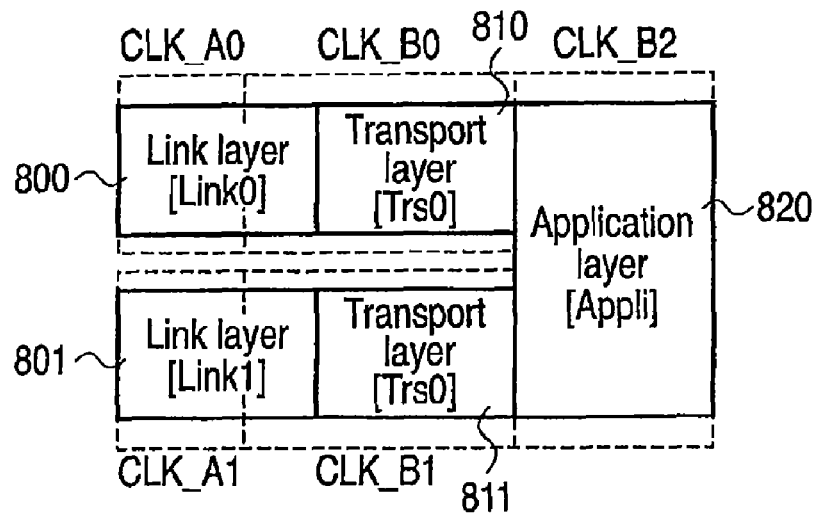
FIG. 8 shows, in association with clock signals used in individual hierarchical levels, an example of the relationship between a communication protocol hierarchical structure of two communication ports included in the multiport interface applied to a modification of the embodiment and an application layer.

FIG. 8 shows, in association with clock signals used in individual hierarchical levels, the relationship between a communication protocol hierarchical structure of a first and a second communication port included in the multiport interface applied to a modification of the embodiment and an application layer. The first communication port is composed of link layer 800 (Link0) and transport layer 810 (Trs0). The second communication port is composed of link layer 801 (Link1) and transport layer 811 (Trs1). In the multiport interface, an application layer 820 (Appli) exists. Link layer 800 and transport layer 810 correspond to link layer 500 and transport layer 510 of FIG. 5. Link layer 801 and transport layer 811 correspond to link layer 501 and transport layer 511 of FIG. 5. Application layer 820 corresponds to application layer 520 of FIG. 5.

A first feature of the modification is that clock signal (second clock signal) CLK_B0 is used in place of clock signal CLK_B in link layer 800 and transport layer 810. A second feature of the modification is that clock signal (fourth clock signal) CLK_B1 is used in place of clock signal CLK_B in link layer 801 and transport layer 811. A third feature of the modification is that clock signal CLK_B2 is used in place of clock signal CLK_B in application layer 820. A fourth feature of the modification is that clock signals CLK_B0, CLK_B1, and CLK_B2 are the same as clock signal CLK_B in frequency and phase and can be disabled independently.

As described above, clock signals CLK_B0, CLK_B1, and CLK_B2 are the same as clock signal CLK_B in frequency and phase. Therefore, the operation based on each of clock signals CLK_B0, CLK_B1, and CLK_B2 is the same as the operation of the embodiment based on clock signal CLK_B.

The modification differs from the embodiment in that, since clock signals CLK_B0, CLK_B1, and CLK_B2 can be disabled independently, for example, not only clock signal CLK_A0 but also clock signal CLK_B0 can be selectively disabled (stopped) in a state where link layer 800 (Link0) is not used. As a result, the power consumption of the entire (device including) multiport interface can be reduced without affecting other link layer 801 (Link1), transport layer 811 (Trs1), and the like which are in operation. In the embodiment, the state where link layer 800 (Link0) is not used means, for example, a state Link0 side is not connected to host H0 or a state where Link0 side is set in the power save mode even if Link0 is connected to host H0.

Figure 9:
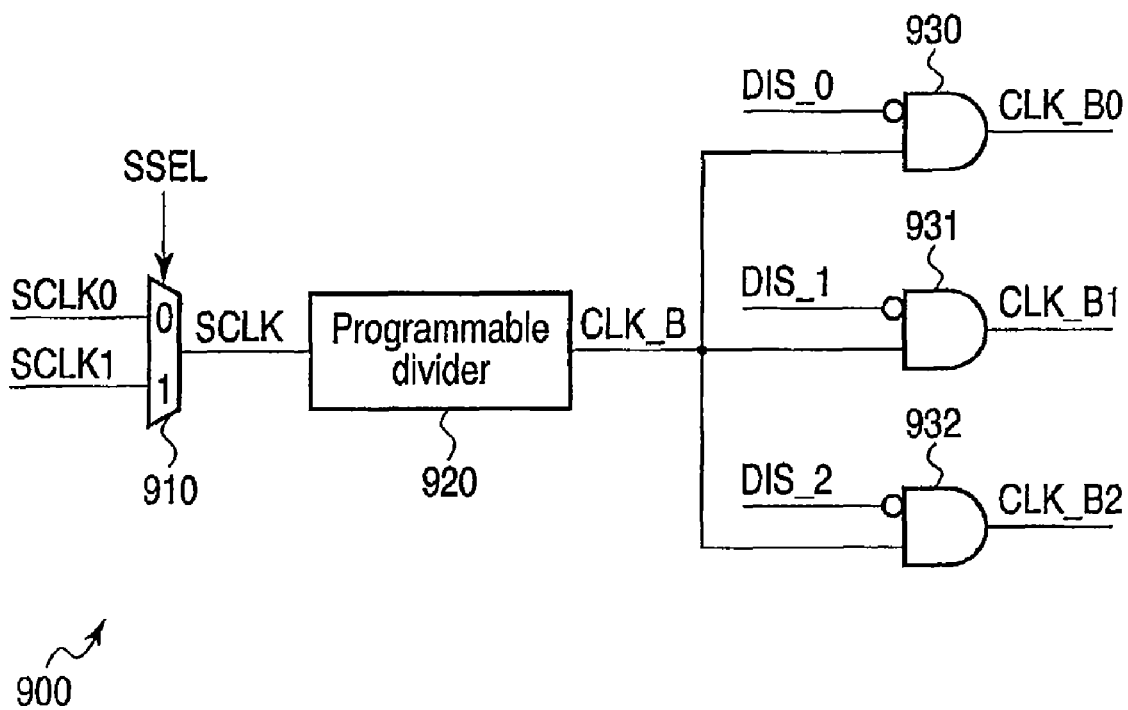
FIG. 9 is a block diagram showing an exemplary configuration of a clock generator applied to the modification.

FIG. 9 is a block diagram showing the configuration of a clock generator for generating clock signals CLK_B0, CLK_B1, and CLK_B2 shown in FIG. 8 independently. As shown in FIG. 9, the clock generator 900 comprises a selector 910, a programmable divider 920, and ANDs 930, 931, and 932.

Selector 910 selects, for example, one of two source clock signals SCLK0 and SCLK1 as source clock signal SCLK in accordance with source selection signal SSEL. Programmable divider 920 frequency-divides source clock signal SCLK selected by selector 910, thereby generating clock signal CLK_B as used in the embodiment. In the embodiment, clock signal CLK_B, that is, clock signal CLK_B output from programmable divider 920, is shared by link layers 500 and 501, transport layers 510 and 511, and application layer 520.

In the modification, clock signal (fifth clock signal) output from programmable divider 920 is input to each of ANDs 930, 931, and 932. ANDs 930, 931, and 932 determine independently whether to output clock signal CLK_B as valid clock signal CLK_B0, CLK_B1, and CLK_B2 in accordance with disable signals DIS_0, DIS_1, and DIS_2, respectively. As a result, in the modification, clock signals CLK_B0, CLK_B1, and CLK_B2 which are the same as clock signal CLK_B in frequency and phase can be stopped independently.

In the embodiment and its modification, the allowed frequency range of the second clock signal can be expand in a data synchronizer which synchronizes data synchronized with the first clock signal with the second clock signal differing from the first clock signal in frequency.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data synchronizer comprising:
   a data hold module configured to receive first data synchronized with a first clock signal on the basis of a second timing signal and output second data obtained by synchronizing the received first data with a second clock signal differing from the first clock signal in frequency;
   a reception timing generation module configured to generate a timing signal synchronized with the second clock signal as the second timing signal on the basis of a first timing signal corresponding to the first data and synchronized with the first clock signal, the reception timing generation module comprising flip-flops connected in cascade; and
   an update timing adjusting module configured to limit the timing to update the flip-flops in value on the basis of an update enable signal synchronized with the second clock signal.

2. The data synchronizer of claim 1, wherein:
   the update enable signal is asserted once in a plurality of cycles of the second clock signal; and
   the update timing adjusting module is configured to permit the update of the values of the flip-flops in a cycle of the second clock signal in which the update enable signal is asserted.

3. The data synchronizer of claim 2, wherein the reception timing generation module further comprises:
   a first logic gate configured to detect a state where the output of the last-stage one of the flip-flops and the output of a flip-flop in a stage preceding the last stage differ in value from each other for the first time after the timing shown by the first timing signal; and
   a second logic gate configured to output the output signal of the first logic gate as the second timing signal during a period when the update enable signal is asserted.

4. The data synchronizer of claim 3, wherein the update timing adjusting module comprises selectors corresponding to the flip-flops respectively, each of the selectors being configured to select a signal used to update the value of the corresponding one of the flip-flops and output the selected signal to the corresponding flip-flop during a period when the update enable signal is asserted.

5. A communication interface comprising:
   a first data synchronizer configured to synchronize first data synchronized with a first clock signal with a second clock signal differing from the first clock signal in frequency; and
   a second data synchronizer configured to synchronize third data synchronized with a third clock with a fourth clock signal differing from the third clock signal in frequency and phase and coinciding with the second clock signal in frequency and phase, and
   wherein the first data synchronizer comprises:
      a first hold module configured to receive the first data on the basis of a second timing signal and output second data obtained by synchronizing the received first data with the second clock signal;
      a first reception timing generation module configured to generate a timing signal synchronized with the second clock signal as the second timing signal on the basis of a first timing signal corresponding to the first data and synchronized with the first clock signal, the first reception timing generation module comprising first flip-flops connected in cascade; and a first update timing adjusting module configured to limit the timing to update the first flip-flops in value on the basis of a first update enable signal synchronized with the second clock signal, and wherein the second data synchronizer comprises:

a second data hold module configured to receive the third data on the basis of a fourth timing signal and output fourth data obtained by synchronizing the received third data with the fourth clock signal;

a second reception timing generation module configured to generate a timing signal synchronized with the fourth clock signal as the fourth timing signal on the basis of a third timing signal corresponding to the third data and synchronized with the third clock signal, the second reception timing generation module comprising second flip-flops connected in cascade; and a second update timing adjusting module configured to limit the timing to update the second flip-flops in value on the basis of a second update enable signal synchronized with the fourth clock signal.

6. The communication interface of claim 5, further comprising a clock generation module configured to generate the second clock signal and the fourth clock signal independently.

7. The communication interface of claim 5, wherein the second clock signal is used as the fourth clock signal.

8. A data synchronizer comprising:

a reception module configured to receive first data synchronized with a first clock signal;

a generation module configured to generate a second timing signal synchronized with a second clock signal differing from the first clock signal in frequency based on a first timing signal and an enable signal, wherein the first timing signal is synchronized with the first clock signal, and the enable signal is synchronized with the second clock signal and corresponds to the first clock signal; and an output module configured to output second data synchronized with the second clock signal and the generated second timing signal from the received first data.

9. A communication device comprising a controller configured to transmit and to receives data to and from a host, wherein the controller comprises the data synchronizer of claim 8.

* * * * *